US008853638B2

(12) United States Patent
Tanaka et al.

(10) Patent No.: US 8,853,638 B2
(45) Date of Patent: Oct. 7, 2014

(54) RADIOACTIVITY EVALUATION METHOD AND RADIOACTIVITY EVALUATION SYSTEM

(71) Applicants: The Japan Atomic Power Company, Chiyoda (JP); Kabushiki Kaisha Toshiba, Tokyo (JP)

(72) Inventors: Kenichi Tanaka, Tokyo (JP); Hidenori Tanabe, Tokyo (JP); Hideaki Ichige, Tokyo (JP); Masahiko Kurosawa, Kanagawa (JP); Satoshi Yagishita, Kanagawa (JP); Kaoru Matsushita, Kanagawa (JP); Takayuki Hirouchi, Kanagawa (JP); Hidehiko Iida, Kanagawa (JP); Tatsuya Ikeda, Kanagawa (JP); Koh Akatsu, Kanagawa (JP)

(73) Assignees: The Japan Atomic Power Company, Tokyo (JP); Kabushiki Kaisha Toshiba, Tokyo (JP)

( * ) Notice: Subject to any disclaimer, the term of this patent is extended or adjusted under 35 U.S.C. 154(b) by 43 days.

(21) Appl. No.: 13/768,348

(22) Filed: Feb. 15, 2013

(65) Prior Publication Data

US 2013/0214171 A1 Aug. 22, 2013

(30) Foreign Application Priority Data

Feb. 17, 2012 (JP) .................. 2012-032800

(51) Int. Cl.
*G01T 1/02* (2006.01)
*G21D 1/00* (2006.01)
*G01T 3/00* (2006.01)

(52) U.S. Cl.
CPC ............... *G01T 3/001* (2013.01); *G21D 1/003* (2013.01)

USPC ...................................... 250/370.07; 376/254

(58) Field of Classification Search
CPC ........... G21D 1/02; G21D 1/003; G21D 3/04; G21D 1/00; G21D 1/006
USPC ...................................... 250/390.07; 376/254
See application file for complete search history.

(56) References Cited

U.S. PATENT DOCUMENTS

| | | | |
|---|---|---|---|
| 5,077,685 A * | 12/1991 | Iwashima et al. ................ | 703/18 |
| 2010/0004498 A1 * | 1/2010 | Binner .............................. | 588/4 |
| 2011/0288903 A1 * | 11/2011 | Mahe-Doutreluingne et al. ............................ | 705/7.23 |
| 2012/0257706 A1 * | 10/2012 | Longoni et al. ................ | 376/254 |

FOREIGN PATENT DOCUMENTS

JP 64-88288 4/1989
JP 2005-321249 11/2005

OTHER PUBLICATIONS

L.C. Gauld, et al., "Origen-S—Functional Modules", SCALE Overview, Sep. 2004, 1 page.

* cited by examiner

*Primary Examiner* — David Porta
*Assistant Examiner* — Taeho Jo
(74) *Attorney, Agent, or Firm* — Oblon, Spivak, McClelland, Maier & Neustadt, L.L.P.

(57) ABSTRACT

According to an embodiment, a radioactivity evaluation method has: a first input step; a selection step in which the calculating section selects a representative neutron energy spectrum and a representative neutron fluence rate; a second input step; an radioactivity calculating step in which the calculating section calculates quantities of the radioactivity that correspond to the representative neutron energy spectra and the representative neutron fluence rates; a data storing step; a nuclide-by-nuclide radioactivation reaction rate calculating step in which the calculating section calculates a radioactivation reaction rate of each nuclide based on the neutron energy spectra at the position of each of the object sections; an object-by-object adding-up step; a nuclide determining step; and an object position determining step.

8 Claims, 10 Drawing Sheets

RADIOACTIVITY EVALUATION METHOD AND RADIOACTIVITY EVALUATION SYSTEM

CROSS-REFERENCE TO RELATED APPLICATIONS

This application is based upon and claims the benefit of priority from Japanese Patent Application No. 2012-032800 filed on Feb. 17, 2012, the entire content of which is incorporated herein by reference.

FIELD

Embodiments described herein relate to a radioactivity evaluation method and a radioactivity evaluation system.

BACKGROUND

In some nuclear power facilities and radioactive material handling facilities that are exposed to irradiation of neutrons generated as a result of nuclear fission in nuclear reactors or irradiation of neutrons generated by accelerators, some stable isotopes in materials of neutron generating apparatus, apparatus surrounding them, equipment and structures receive neutron irradiation to be activated and to become radioisotopes. After stopping operation or terminating service of such apparatus, those radioisotopes survive in the apparatus.

It is vitally important to accurately evaluate the quantity of radioisotopes generated as a result of radioactivation by neutron irradiation. That is, it is important from the viewpoint of: planning work projects; taking radiation protection measures for radiation workers; evaluating the radioactivity level and the amount of the radioactive wastes produced as a result of repairing and/or replacing apparatus and equipment and decommissioning facilities; and planning processing and disposal programs.

A radioactivity evaluation method of evaluating radioactivity of an object such as an apparatus, equipment or a structure (to be simply referred to as "object" hereinafter) by sampling parts of the object and using its actually measured values can be used. Such method is disclosed in Japanese Patent Application Laid-Open Publication No. 2005-321249, the entire content of which is incorporated herein by reference.

Radioactivity is generally calculated with the conditions such as the composition of the component elements in the material of the object, the duration of neutron irradiation, the cooling period after neutron irradiation on the object and neutron flux on each energy at each spot. Such method is disclosed in as illustrated in "Basic Procedure to determine the Activity Concentration of Sub-surface Disposal Waste: 2010 (AESJ-SC-F015:2010)", the Standards Committee of the Atomic Energy Society of Japan.

Neutron energy spectrum changes continuously in sites such as nuclear power plants where objects over a wide region surround a nuclear reactor which is a neutron source. Therefore, a vast amount of calculation is required to accurately evaluate the radioactivity of each spot. That is, the radioactivity of each object needs to be reviewed and recalculated where calculation condition is different from that of calculation completed object. Recalculation is necessary corresponding to the changes of the conditions such as the neutron energy spectrum, the composition of the component elements constituting the material of the object, the nuclide to be evaluated, the duration of neutron radiation, the cooling period or some other condition.

In other words, in order to accurately determine the distribution of radioactivity by radioactivity calculations, it is necessary to perform calculations to reflect the neutron energy spectral distribution in detail. There may arise a need of repeatedly performing a vast amount of radioactivity calculation when the object is a nuclear power plant that covers a wide region and includes the outside of concrete radiation shield surrounding the nuclear reactor or the like.

For planning a processing and disposal program of a facility, it is necessary to evaluate the radioactivity level and the amount of the radioactive wastes produced as a result of decommissioning the facility and so on from early stages. For this purpose, the radioactivity needs to be evaluated in advance.

Figure 10:
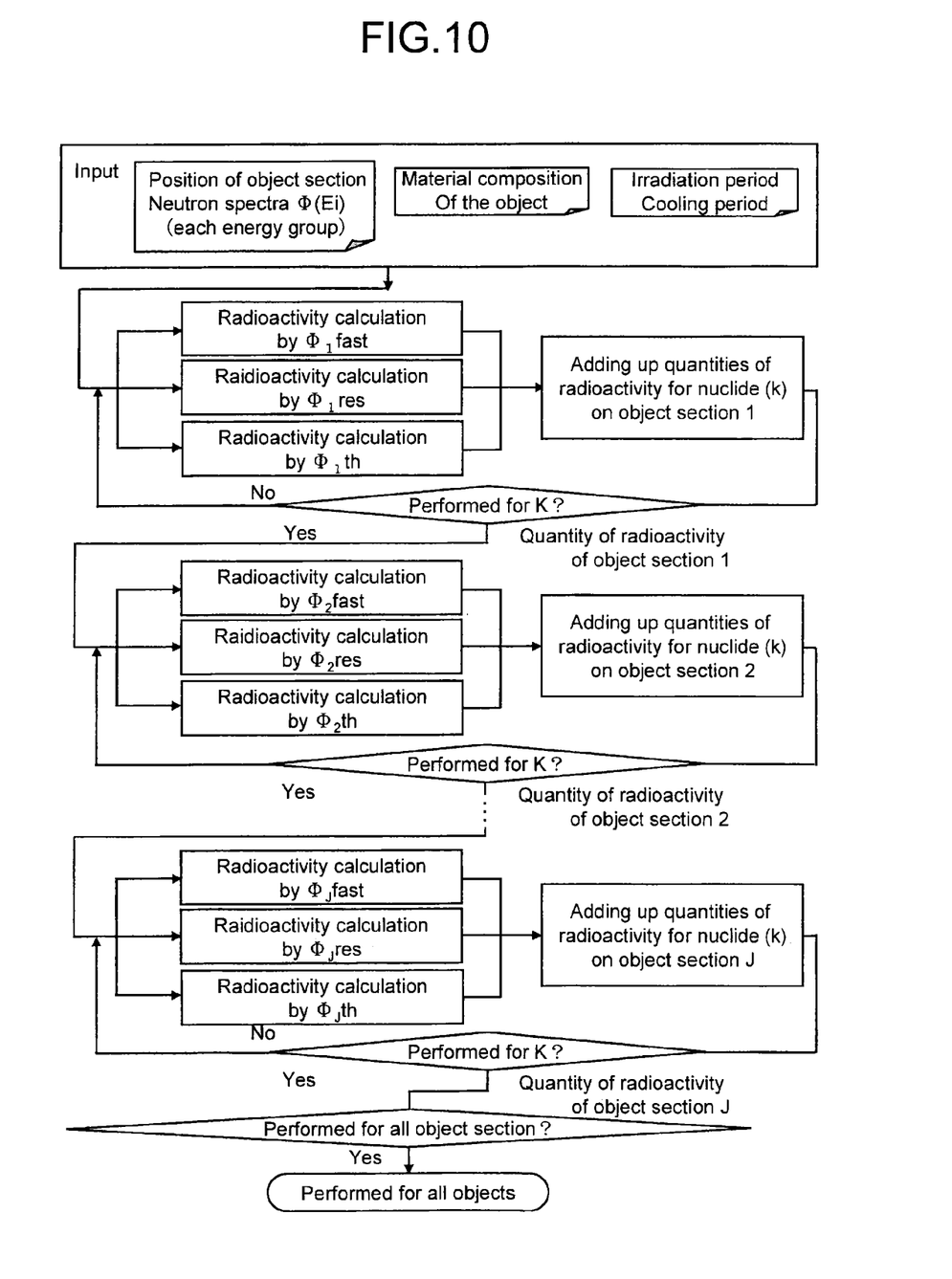
FIG. 10 is a flowchart of a conventional radioactivity evaluation method.

FIG. 10 is an operational flowchart of a known radioactivity evaluation method.

To begin with, the neutron fluence rate and the neutron energy spectrum on each section in the object is calculated and given. The energy groups of neutron energy spectra are selected by the evaluator. For example, those can be the three energy groups including a fast neutron group, an epithermal neutron group and a thermal neutron group. In the instance of FIG. 10 where there are object sections 1 through J, the radioactivity of those object sections are evaluated sequentially. The radioactivities on a single object section are calculated on all the nuclides k of the section and on each energy group. Radioactivity should be respectively calculated on each point because the result of radioactivity calculations on each point is basically different due to the different neutron energy spectrum and the different material composition on each point.

The number of necessary radioactivity calculation cases increases proportionally as the number of energy groups, the number of the type of nuclides or the number of positions in an object section increases.

A method of dividing the region into some blocks, or sub-regions with a certain size and of performing radioactivity calculations by setting representative neutron energy spectrum condition on each sub-region can be used for the reduction of the radioactivity calculation amount. The neutron energy spectra conditions should be conservative in above method from the point of radiation protection measures and radioactive waste disposal. The method results in overestimation of radiation exposure and radioactive waste amount.

On the other hand, in order to improve the accuracy of evaluation, sub-regions have to be made smaller. Such a subdivision entails a prolonged operation because of an increased amount of radioactivity calculation.

An effective and efficient evaluation method needs to be developed for advance decommissioning planning. While Japanese Patent Application Laid-Open Publication No. 2005-321294 discloses a method of using actually measured values for evaluating the quantity of radioactivity, there is no disclosed technique for efficiently evaluating radioactivity by means of calculations in advance for actual decommissioning planning.

BRIEF DESCRIPTION OF THE DRAWINGS

The features and advantages of the present invention will become apparent from the discussion hereinbelow of specific, illustrative embodiments thereof presented in conjunction with the accompanying drawings, wherein.

DETAILED DESCRIPTION

Thus, an object of the present invention is to provide a radioactivity evaluation method and a radioactivity evaluation system that are effective, accurate and efficient for an advance planning.

According to an embodiment, there is provided a radioactivity evaluation method of evaluating radioactivity on each object sections irradiated with neutrons in a neutron generating facility by means of a radioactivity evaluation system including an calculating section, a memory section, an input section and an output section, the method comprising: a first input step in which the input section reads in a neutron energy spectrum at each position of the object sections, an irradiation period and a cooling period and composition of each material of the object sections; a selection step in which the calculating section selects a representative neutron energy spectrum and a representative neutron fluence rate from the neutron energy spectra at each position of the object sections read in the first input step; a second input step in which the calculating section reads in the representative neutron energy spectra and the representative neutron fluence rates selected in the above selection step; a radioactivity calculating step in which the calculating section calculates quantities of the radioactivity that correspond to the representative neutron energy spectra and the representative neutron fluence rates on the basis of the neutron energy spectra at each position of the object sections, the irradiation period and the cooling period, and the composition of the material of each object sections read in the first input step and the representative neutron energy spectra and the representative neutron fluence rate read in the second input step; a data storing step in which the memory section stores the quantities of the radioactivity calculated in the radioactivation calculating step as radioactivity data; a nuclide-by-nuclide radioactivation reaction rate calculating step in which the calculating section calculates a radioactivation reaction rate of each nuclide on the basis of the neutron energy spectra at each position of the object sections read in the first input step and the radioactivity data stored in the data storing step; an object-by-object adding-up step in which the calculating section adds up the radioactivation reaction rates of constituting nuclides calculated for each object sections in the nuclide-by-nuclide radioactivation reaction rate calculating step a nuclide determining step in which the calculating section determines if the radioactivation reaction rates of the constituting nuclides are added up in the object-by-object adding-up step or not; and an object position determining step in which the calculating section determines if the adding-up operation is performed for the positions of the object sections or not.

According to another embodiment, there is provided a radioactivity evaluation system for evaluating radioactivity of an object to be irradiated with neutrons in a neutron generating facility; the system comprising: a first input section that reads in neutron energy spectra, an irradiation period and a cooling period at a position of each of object sections and composition of material of each of the object sections; a selection section that selects a representative neutron energy spectrum and a representative neutron fluence rate from the neutron energy spectra at the position of each of the object sections read in the first input section; a second input section that reads in the representative neutron energy spectra and the representative neutron fluence rates selected in the selection section; a radioactivity calculating section that calculates quantities of the radioactivity that correspond to the representative neutron energy spectra and the representative neutron fluence rates on the basis of the neutron energy spectra, the irradiation period and the cooling period at the position of each of the object sections and the composition of the material of each of the object sections read in the first input section and the representative neutron energy spectra and the representative neutron fluence rate read in the second input section; a data memory section that stores the quantities of the radioactivity calculated in the radioactivity calculating section; a nuclide-by-nuclide radioactivation reaction rate calculating section that calculates a radioactivation reaction rate of each nuclide on the basis of the neutron energy spectra at the position of each of the object sections read in the first input section and a radioactivity data stored in the data memory section; an object-by-object adding-up section that adds up the radioactivation reaction rates of constituting nuclides calculated for each of the object sections in the nuclide-by-nuclide radioactivation reaction rate calculating section; a nuclide determining section that determines if the adding up of the radioactivation reaction rates of the constituting nuclides are accomplished in the object-by-object adding-up section or not; and an object position determining section that determines if the adding-up operation is accomplished for the positions of the object sections or not.

Now, embodiments of radioactivity evaluation method and radioactivity evaluation system according to the present invention will be described below by referring to the accompanying drawings. Throughout the drawings, same or similar components are denoted by the same reference symbols and will not be described repeatedly.

First Embodiment

Figure 1:
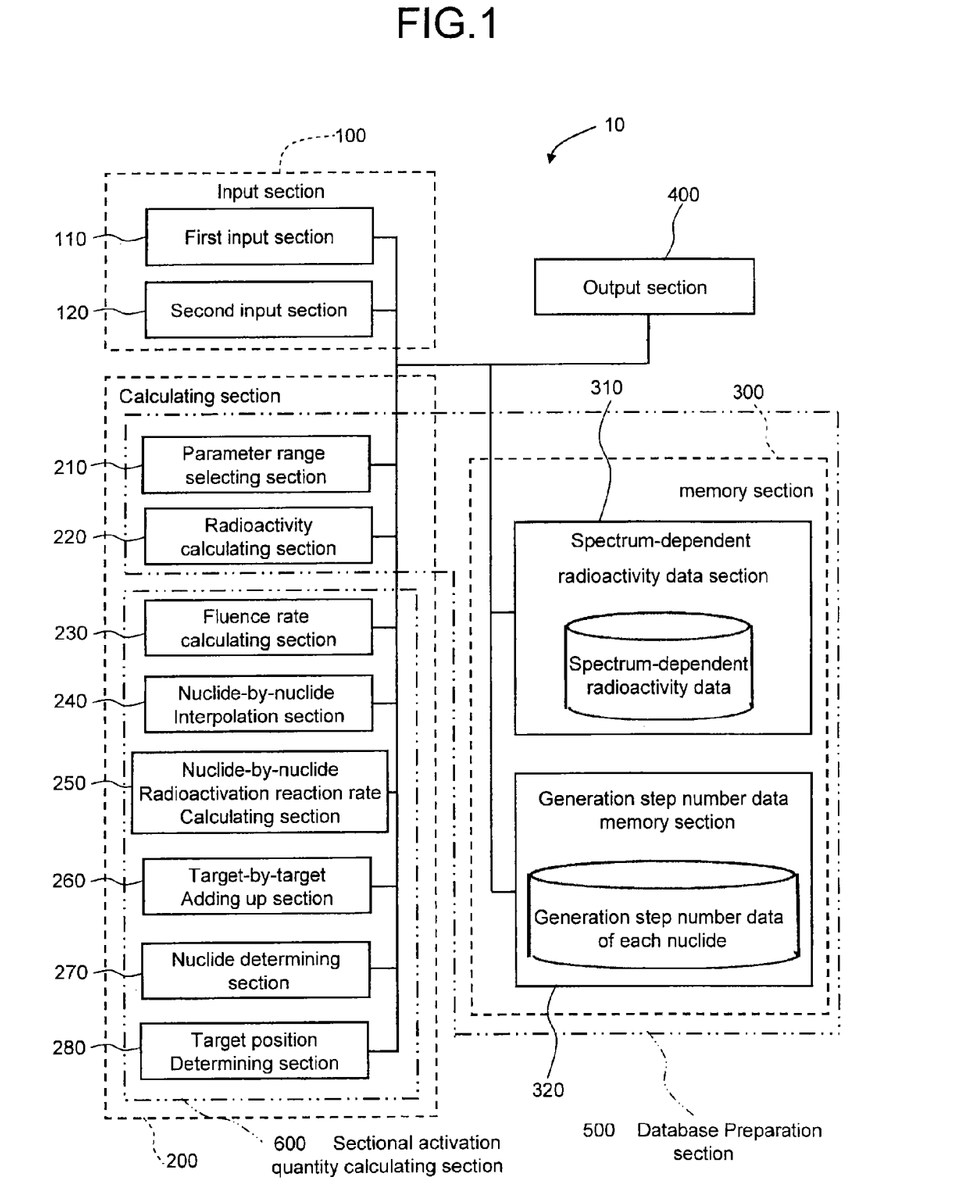
FIG. 1 is a schematic block diagram of the first embodiment of radioactivity evaluation system according to the present invention, illustrating the configuration thereof.

FIG. 1 is a schematic block diagram of the first embodiment of radioactivity evaluation system according to the present invention, illustrating the configuration thereof.

The radioactivity evaluation system 10 includes an input section 100, a calculating section 200, a memory section 300 and an output section 400.

The input section 100 includes a first input section 110 for initially reading data and a second input section 120 for reading in the results of partially processing by the calculating section 200.

The calculating section 200 includes a parameter range selecting section 210, an radioactivity calculating section 220, a ratio of fluence rate calculating section 230, a nuclide-by-nuclide interpolating section 240, a nuclide-by-nuclide radioactivation reaction rate calculating section 250, an object-by-object adding up section 260, a nuclide determining section 270 and an object position determining section 280.

The memory section 300 includes a spectrum-dependent radioactivity data memory section 310 and a generation step number data memory section 320.

The components other than the input section 100 and the output section 400 can be classified into either a database preparation section 500 that is a section for preparing a database or a sectional radioactivity quantity calculating section 600 that evaluates the quantity of the radioactivity of each section, using the data in the database.

The parameter range selecting section 210 and the radioactivity calculating section 220 of the calculating section 200 are the part thereof for calculating the data to be stored in the memory section 300. The parameter range selecting section 210, the radioactivity calculating section 220 and the spectrum-dependent radioactivity data memory section 310 and the generation step number data memory section 320 of the memory section 300 belong to the database preparation section 500.

Components of the calculating section 200 except the parameter range selecting section 210 and the radioactivity calculating section 220 belong to the sectional radioactivity quantity calculating section 600.

Figure 2:
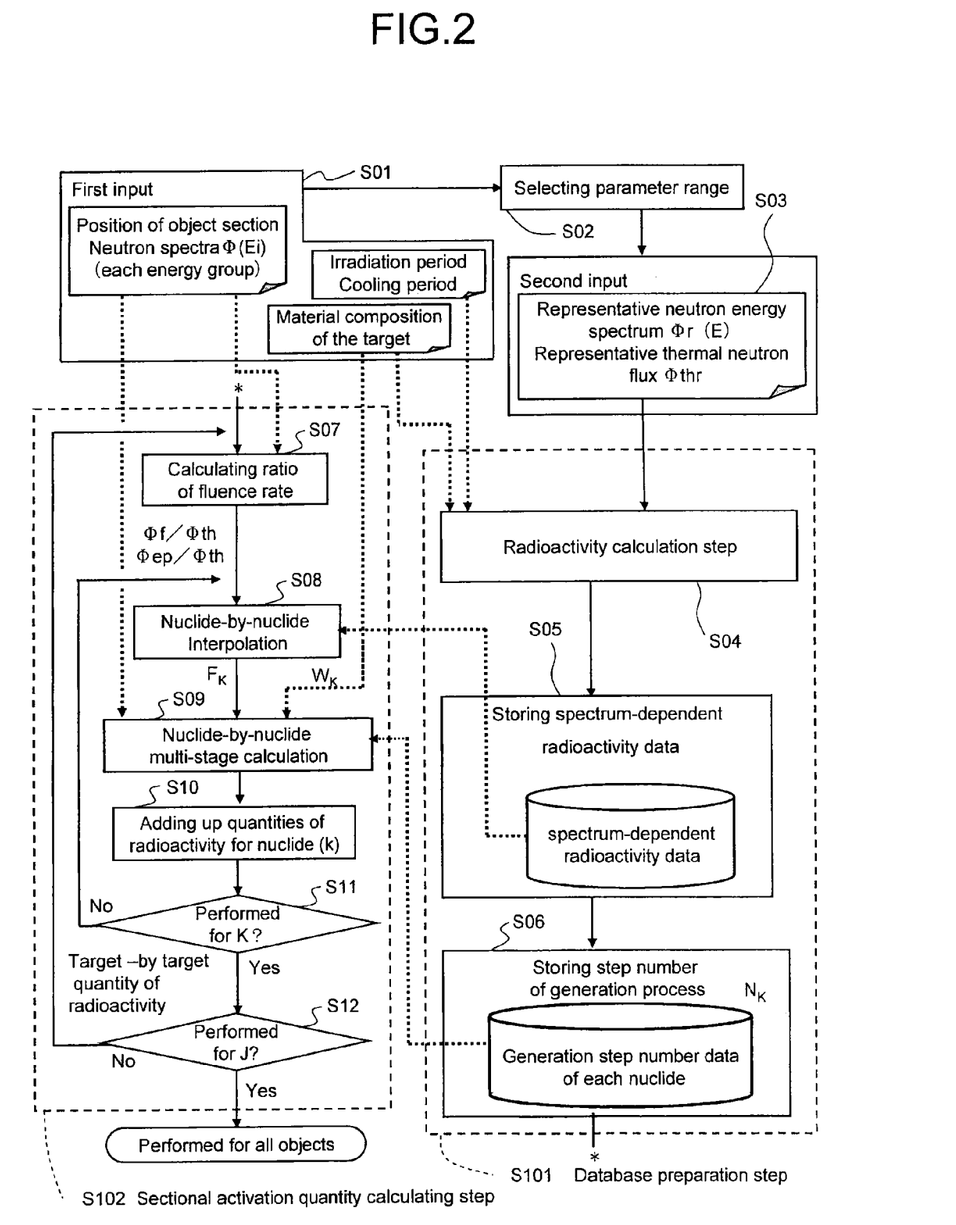
FIG. 2 is a flowchart of the first embodiment of radioactivity evaluation method according to the present invention.

FIG. 2 is a flowchart of the first embodiment of radioactivity evaluation method according to the present invention.

The flow of the radioactivity evaluation method with this embodiment will be described below by referring to FIG. 2.

The conditions such as neutron fluence rate of each energy group and the neutron energy spectra at each position or object section, in the equipment, apparatus or the structure (object) to be evaluated, the irradiation period and the cooling period, and material composition of the object are read into the system in the first input step S01. An object section can be an entire object or its part in the case that the neutron energy spectrum on the object changes drastically.

The neutron fluence rate is basically continuously-varying corresponding to the neutron energy value. The neutron spectrum which changes continuously can be contracted by dividing energy into a limited multi-group and setting an equivalent neutron fluence rate for each group ("contraction"). FIG. 2 illustrates an instance of dividing energy into three energy groups including a fast neutron group, an epithermal neutron group and a thermal neutron group. The processing sequence described here is applicable to any number of energy groups regardless if it is three or other than three.

The neutron fluence rate of each energy group is expressed by $\phi(E_i)$. $E_i$ indicates the energy group. In the instance of three groups including a fast neutron group, an epithermal neutron group and a thermal neutron group, their neutron fluence rates $\phi(E_i)$ are respectively expressed by $\phi f$, $\phi ep$ and $\phi th$.

The irradiation period is a period during which the object is irradiated by neutrons in a facility. The cooling period is a period from a time when neutron irradiation stopped to a time when decommissioning work starts. Radionuclides decay during that time period.

The representative neutron energy spectrum $\phi r(E)$ and the representative thermal neutron fluence rate $\phi thr$ to be used when a database is prepared are set in the parameter range selecting step S02. Those are set according to the neutron energy spectra at the position of each object section and the neutron fluence rate of each energy group read in the first input step.

The representative neutron energy spectrum $\phi r(E)$ varies according to the locations of a number of object sections and hence includes a plurality of spectra that covers the range of them. In the instance of three energy groups, a set of $\phi f$, $\phi ep$ and $\phi th$ expresses a single spectrum.

The representative thermal neutron fluence rates $\phi thr$ vary according to the locations of a number of object sections and decrease as functions of the distance from the core. Hence, the representative neutron fluence rates $\phi thr$ include a plurality of values covering a range of different orders.

The representative neutron energy spectra $\phi r(E)$ and the representative thermal neutron fluence rates $\phi thr$ selected in the parameter range selecting step S02 are read into the system in the second input step S03.

Instead of immediately proceeding to the second input step S03 after the parameter range selecting step S02, alternatively, the representative neutron energy spectra $\phi r(E)$ and the representative thermal neutron fluence rates $\phi thr$ can be output and displayed after the parameter range selecting step S02. The results that are checked and amended by the operator can be input to the second input section.

Subsequently, the quantity of the radioactivity with neutron irradiation is calculated in the radioactivity calculation step S04.

For example, the quantity of the radioactivity can be calculated by using the formula (1) shown below.

$$dX_i/dt = \int \phi(E) \Sigma f_{ik} \sigma_k(E) X_k dE + \Sigma g_{ij} \lambda_j X_j - [\lambda_i + \int \phi(E) \cdot \sigma_i(E) \cdot dE] X_i \quad (1),$$

where $X_i$ is the atom density of the generated/induced radioactivity i, $X_k$ is the atom density of object nuclide k, $\phi(E)$ is the neutron energy spectrum of the location, $\sigma_k(E)$ is the neutron absorption cross section of nuclide K, $f_{ik}$ is the generation rate of that nuclide i is absorbed by nuclide k, $\lambda_i$ is the decay constant and $g_{ij}$ is the generation ratio that nuclide j decays to nuclide i.

$\Sigma$ at the first term in the right side of the above formula (1) represents the sum of the nuclides K transitioned to nuclide i. $\Sigma$ at the second term in the right side of the above formula (1) represents the sum of the nuclides j transitioned to nuclide k.

Note that transitions to and from other locations can also be taken into consideration while the formula (1) deals the decay of the object nuclide and transitions to and from other nuclides at a same location, Therefore, the formula that can be used in this step is not limited to the above formula (1) and some other formula for calculating radioactivity can alternatively be used in this step.

In the step S04, the above-described radioactivity calculations are performed for the plurality of representative neutron energy spectra $\phi r(E)$ and the plurality of representative thermal neutron fluence rates $\phi thr$ set in the parameter range selecting step S02 and also for the nuclides constituting the object sections read in the first input step S01.

Figure 3:
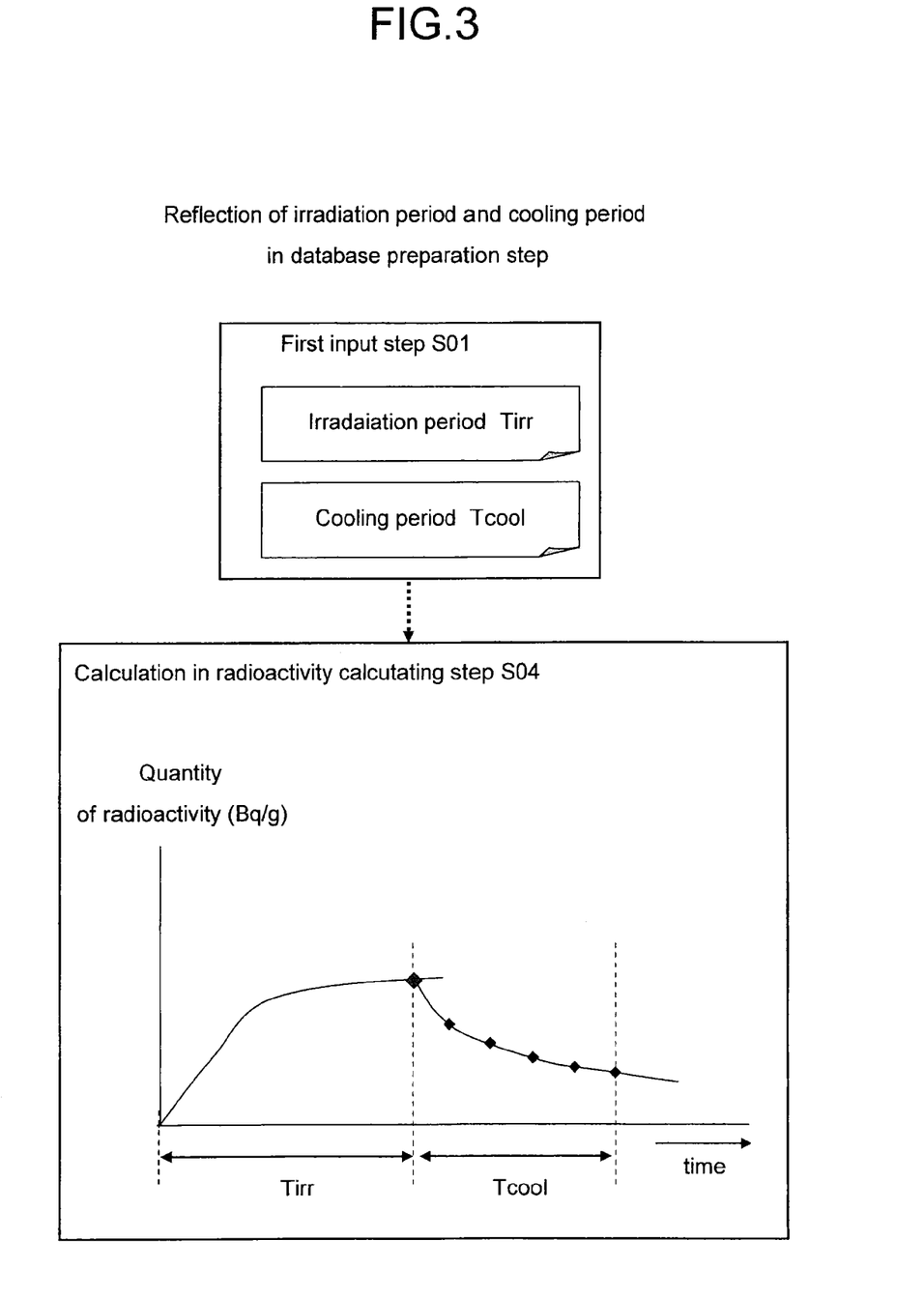
FIG. 3 is a flowchart of the first embodiment of radioactivity evaluation method according to the present invention, which reflects the irradiation period and the cooling period.

FIG. 3 is a flowchart of this embodiment, which reflects the irradiation period and the cooling period. In the radioactivity calculation step S04, the quantity of the radioactivity determined as a result of the above-described radioactivity calculations is corrected to a value obtained by taking them into consideration on the basis of the irradiation period Tirr and the cooling period Tcool read in the first input step S01. The quantity of radioactivity is determined for a representative period on the way down to the cooling period Tcool as for decay due to the cooling period Tcool.

Radioactivity dependent on the neutron spectra is calculated in the radioactivity calculation step S04. It is stored as data in the spectrum-dependent radioactivity data storing step S05.

The data regarding the step number of generation process determined by calculations in the radioactivity calculation step S04 is stored in the step number of generation process storing step S06.

The data regarding the step number of generation process indicates the number of neutron absorption reaction stages that nuclide K are transitioned to nuclide i by neutron irradiation.

For example, a single neutron absorption reaction is necessary in the case of nuclide K (n, y) nuclide i reaction. The step number of generation process in the above case is 1. Where "nuclide K (n" represents that nuclide k absorbs neutron, and "y) nuclide i" represents that nuclide i is produced with gamma-ray emission.

It needs to pass through three neutron absorption reactions and hence the step number of generation process is 3 in the case of nuclide K (n, y) nuclide M (n, y) nuclide N (n, y) nuclide i reaction.

The spectrum-dependent radioactivity data storing step S05 can be executed either before or after the step number of generation process storing step S06. In other words, the above-described order of execution can be reverse.

The radioactivity calculation step S04, the spectrum-dependent radioactivity data storing step S05 and the step number of generation process storing step S06, which come after the second input step S03, are basically steps for preparing in advance a database for evaluation of individual object sections. They are collectively referred to as a database preparation step S101.

Subsequently, the embodiment proceeds to a step that are generally referred to as sectional radioactivity quantity calculating step S102 of evaluating individual object sections. The step S102 uses the database prepared in the database preparation step S101. The sectional radioactivity quantity calculating step S102 will be described below.

First, the ratio of fluence rate calculating step S07, the ratios of the neutron energy spectra φ(Ei) at the positions of the individual object sections read in the first input step S01 are calculated in the ratio of fluence rate calculating step S07. More specifically, the ratio of φf relative to φth (φf/φth), which is referred to as FAST, and the ratio of φep relative to φth (φep/φth), which is referred to as RES, are calculated in the case of the above three groups involving a set of φf, φep and φth.

The set of values of FAST and RES are values that respectively correspond to the shapes of the neutron energy spectra and indicate the characteristics of the neutron energy spectrum. More specifically, it is true to say that the fast neutron take a large part when FAST has a large value. When both FAST and RES take only a small part, it is true to say that neutron energy spectrum is shifted to the low energy side because the neutron fluence rate on high energy is attenuated by equipment, apparatus and structures before neutrons get to the object sections.

The quantity of radioactivity $F_K$ on the object nuclide K is calculated by interpolation calculations with the spectrum-dependent radioactivity data, FAST that is the ratio of φf relative to φloth, and RES that is the ratio of φep relative to φloth in the nuclide-by-nuclide interpolating step S08. FAST and RES are calculated in the ratio of fluence rate calculating step S07. The spectrum-dependent radioactivity data stored in the step S05.

Figure 4:
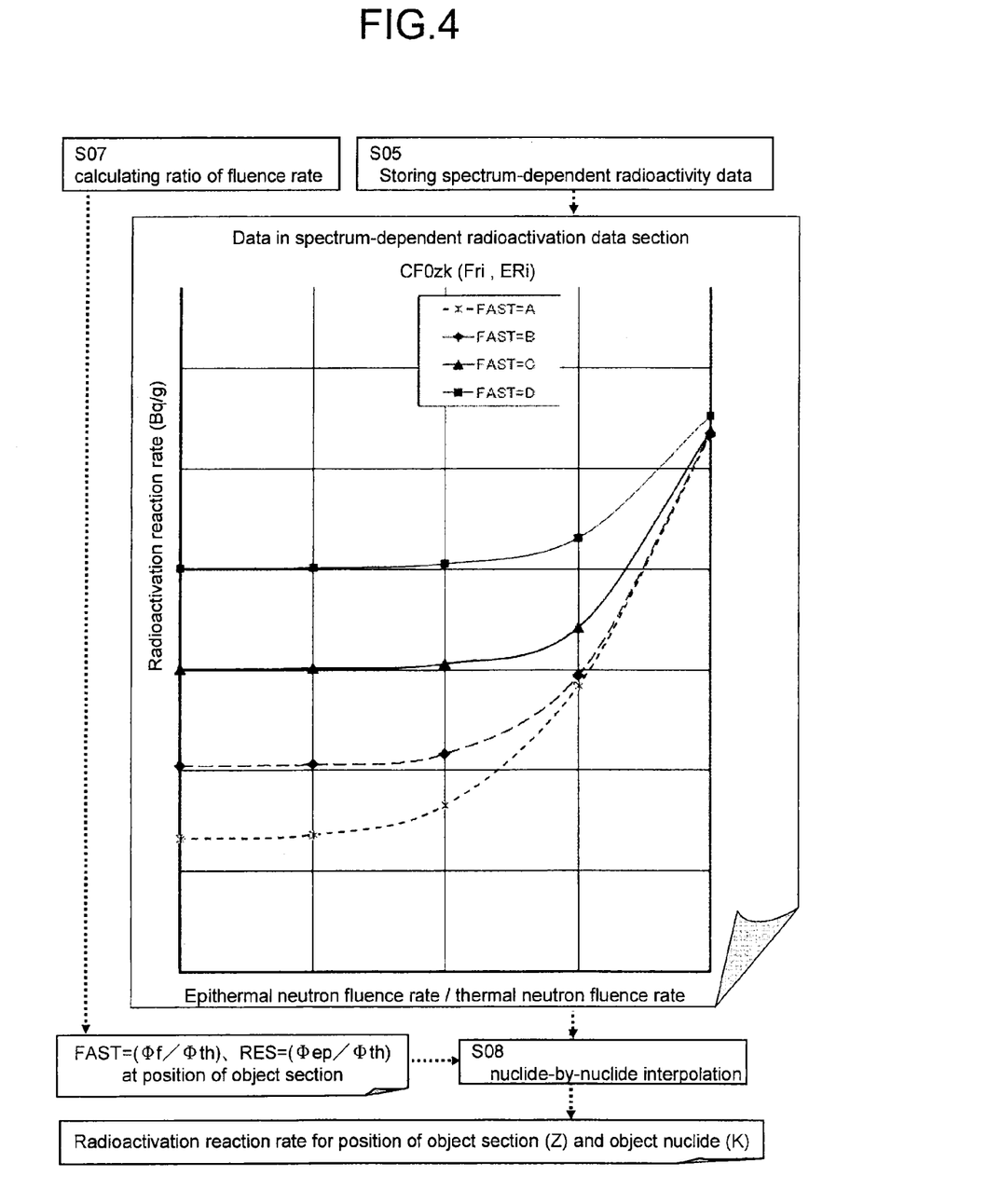
FIG. 4 is a flowchart of the interpolating step of the first embodiment of radioactivity evaluation method according to the present invention.

FIG. 4 is a flowchart of the interpolating step of this embodiment. The figure shows the spectrum-dependent radioactivity data stored in the spectrum-dependent radioactivity data storing step S05. The horizontal axis shows RES as a variable that is the ratio of φep relative to φth. The vertical axis shows the radioactivation reaction rate. The plots correspond to some FAST values as parameter.

The radioactivation reaction rate $F_K$ that corresponds to the neutron energy spectrum at the position of an object section can be determined by means of interpolation calculations using the spectrum-dependent radioactivity data from FAST that is the ratio of φf relative to φth, and RES that is the ratio of φep relative to φth at the position of the object section as calculated in the ratio of fluence rate calculating step S07.

$F_K$ represents the quantity of radioactivity that corresponds to the neutron energy spectrum at the position of an object section. The radioactivity is not based on the neutron fluence rate in the position of the object section. It is based on the representative thermal neutron fluence rate selected in the parameter range selecting step S02.

Figure 5:
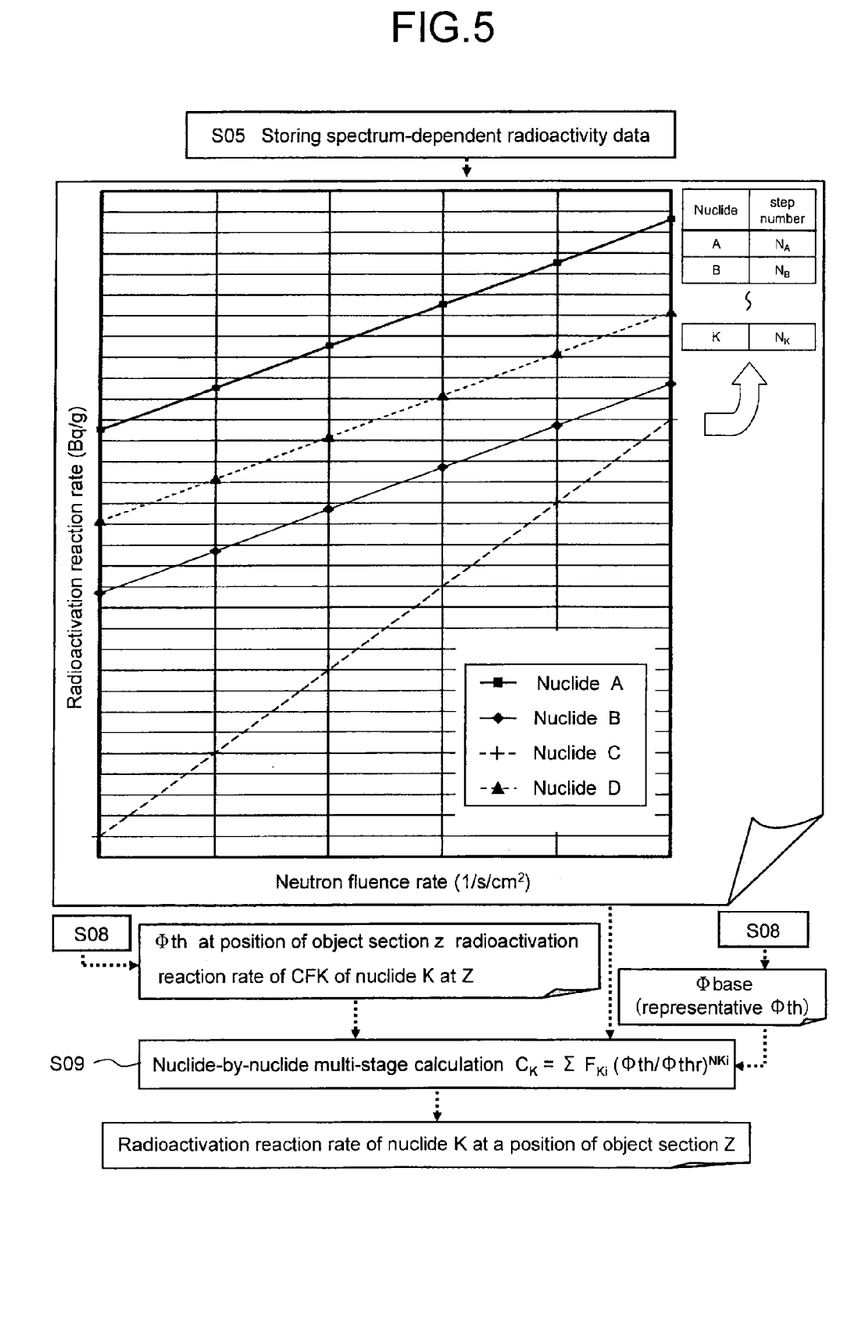
FIG. 5 is a flowchart of the first embodiment of radioactivity evaluation method according to the present invention, illustrating a method of considering the step number of generation process.

FIG. 5 is a flowchart of this embodiment illustrating a method of considering the step number of generation process. The figure shows that the data stored in the spectrum-dependent radioactivity data storing step S05. The horizontal axis shows the neutron fluence rate. The vertical axis shows the radioactivation reaction rate. Both axes are expressed in a logarithmic form. As shown in FIG. 5, the radioactivation reaction rate of each of the nuclides is dependent on the corresponding neutron fluence rate. For example, the lines indicating the nuclides A, B and D show that the step number of generation process of each of them is 1. On the other hand, the broken line indicating the nuclide C shows a gradient that is twice of any of the above line. The step number of generation process thereof is 2.

In the nuclide-by-nuclide multi-stage calculating step S09, all the step number of generation process $N_K$ are determined for all the nuclides on the basis of the quantity of radioactivity $F_K$ determined in the nuclide-by-nuclide interpolating step S08. The data on the step stage number of generation process stored in the step number of generation process storing step S06.

The radioactivity of the nuclide K at the object section is determined by means of the formula (2) shown below. It is determined with the obtained step number of generation process $N_K$, $F_K$ obtained in the nuclide-by-nuclide interpolating step S08, thermal neutron fluence rate φth of the neutron fluence rates φ(Ei) at the position of the object section read in the first input step S01 and the representative thermal neutron fluence rate φthr read in the second input step S03.

$$C_K = \Sigma F_{Ki}(\phi th/\phi thr)^{NKi} \quad (2),$$

where Σ indicates the summation for each nuclide i, i is each of the nuclide for all the nuclides K, $F_{Ki}$ is the quantity of transitioned from the nuclide i to the nuclide K, and $N_{Ki}$ is the step number of generation process from the nuclide i to the nuclide K.

As seen from the formula (2), the quantity of radioactivity $F_K$ with the representative thermal neutron fluence rate φthr is converted into the quantity of radioactivity $C_K$ with the thermal neutron fluence rate φth by multiplying $F_{Ki}$ by (φth/φthr).

(φth/φthr) is raised to the power of $N_{Ki}$ because the step number of generation process is the number of neutron absorption reactions as it is already described in the explanation of step S06. The reaction rate of a neutron absorption reaction is proportional to the neutron fluence rate because the reaction rate is the product of multiplying the reaction cross section by the neutron fluence rate so that ($\phi$th/$\phi$thr) needs to be raised to the power of $N_{Ki}$.

The quantities of radioactivity $C_K$ for the nuclides of the object section as determined in the nuclide-by-nuclide multi-stage calculating step S09 are added up for K in the nuclide adding up step S10.

It is determined if the additions in the nuclide adding up step S10 have been completed for the nuclides of the object section or not in the nuclide determining step S11. The calculations are performed for the next due nuclide in the case the additions are not completed for the nuclides. The embodiment moves to the calculations for the next object section if it is determined that the additions have been performed for the nuclides.

It is determined if the calculations have been completed for all the object sections or not in the nuclide determining step S12. The embodiment moves to calculations for the next due object if it is determined that the calculations have not been completed for the object sections. The embodiment terminates its operation if it is determined that the calculations have been completed for the object sections.

The present embodiment can provide an effective, accurate and efficient radioactivity evaluation method. The results obtained by calculating the quantity of radioactivity for a plurality of instances are used to prepare a database. The quantity of radioactivity is calculated for each object section by executing an interpolation process and a nuclide-by-nuclide multi-stage calculation process. Total radioactivity is obtained with the data of the database.

Second Embodiment

This embodiment is for instances where the step number of generation process $N_K$ can not be regarded as constant while the first embodiment is for instances where the step number of generation process $N_K$ is constant regardless of the nuclide fluence rate.

Figure 6:
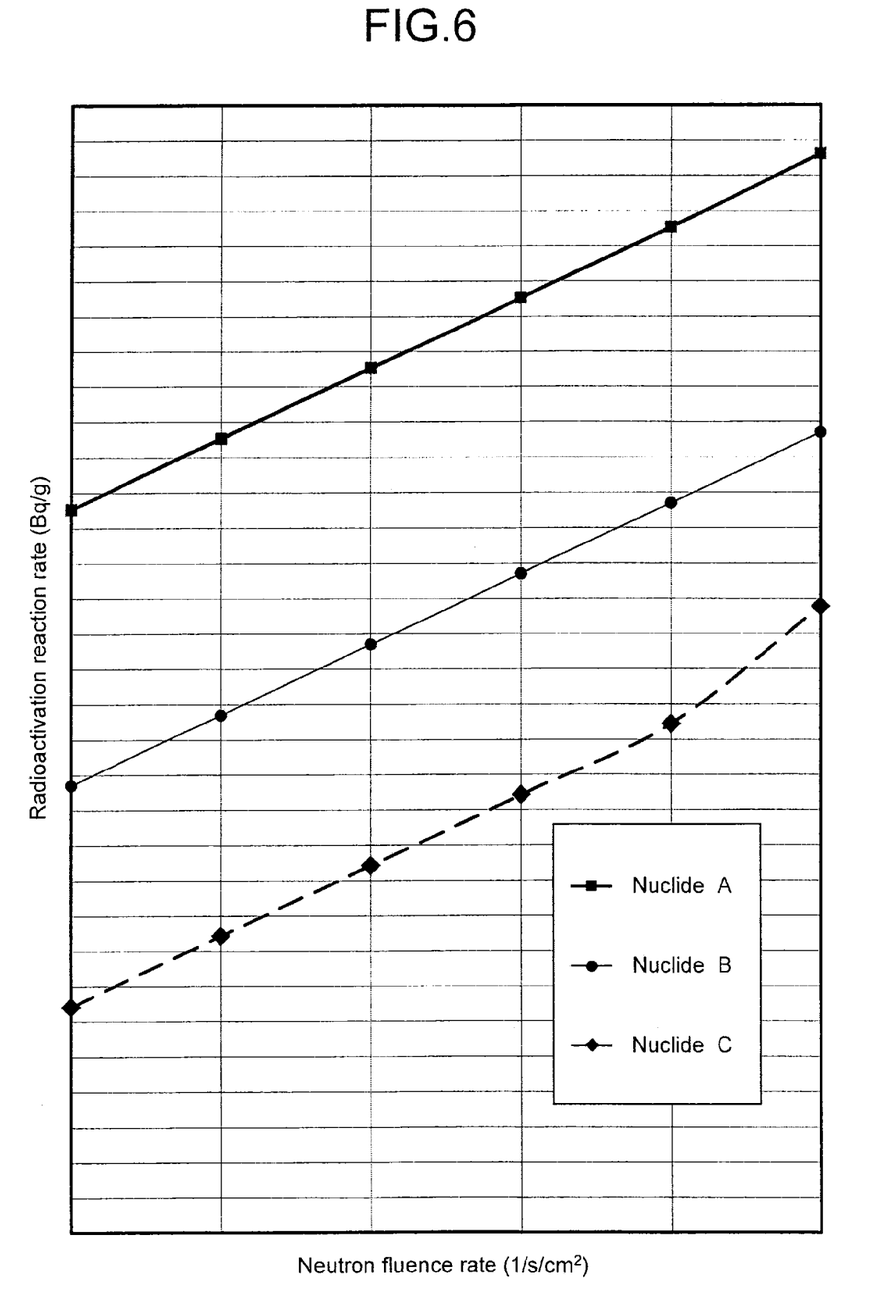
FIG. 6 is a graph of the second embodiment of radioactivity evaluation method according to the present invention, illustrating the step number of generation process.

FIG. 6 is a graph illustrating the step number of generation process for this embodiment. The line of the nuclide C indicated by a broken line in FIG. 6 shows a high gradient in a high neutron fluence rate region. In other words, $N_K$ grows larger in a high neutron fluence rate region. Such a phenomenon where the value of $N_K$ varies depending on the neutron fluence rate may occur in an instance as described below.

Assume here that the radioactivation reaction regarding the nuclide K has two paths including a path from the nuclide P and a path from the nuclide Q. Also assume that the step number of generation process is 1 for the path from the nuclide P and moving to the nuclide K, whereas the step number of generation process is 2 for the path from the nuclide Q and moving to the nuclide K. Then, the radioactivity of the first path is expressed by the formula (3) and that of the second path is expressed by the formula (4) shown below.

$$Ckp = Fkp \cdot (\phi th/\phi thr) \quad (3)$$

$$Ckq = Fkq \cdot (\phi th/\phi thr)^2 \quad (4)$$

If the relationship of Fkp>>Fkq is applicable, Ckp>>Ckq in a region where $\phi$th is relatively small, whereas Ckp<<Ckq can be true in a region where $\phi$th is sufficiently large.

A region where Ckp and Ckq have values of the approximately same order of magnitude can exist. This region can exist within the scope of the area of neutron fluence rate for which an object section needs to be evaluated. The gradient of the characteristic curve in the region varies corresponding to the neutron fluence rate as shown for the nuclide C on FIG. 6. The gradient of the characteristic curve corresponds to $N_K$.

Figure 7:
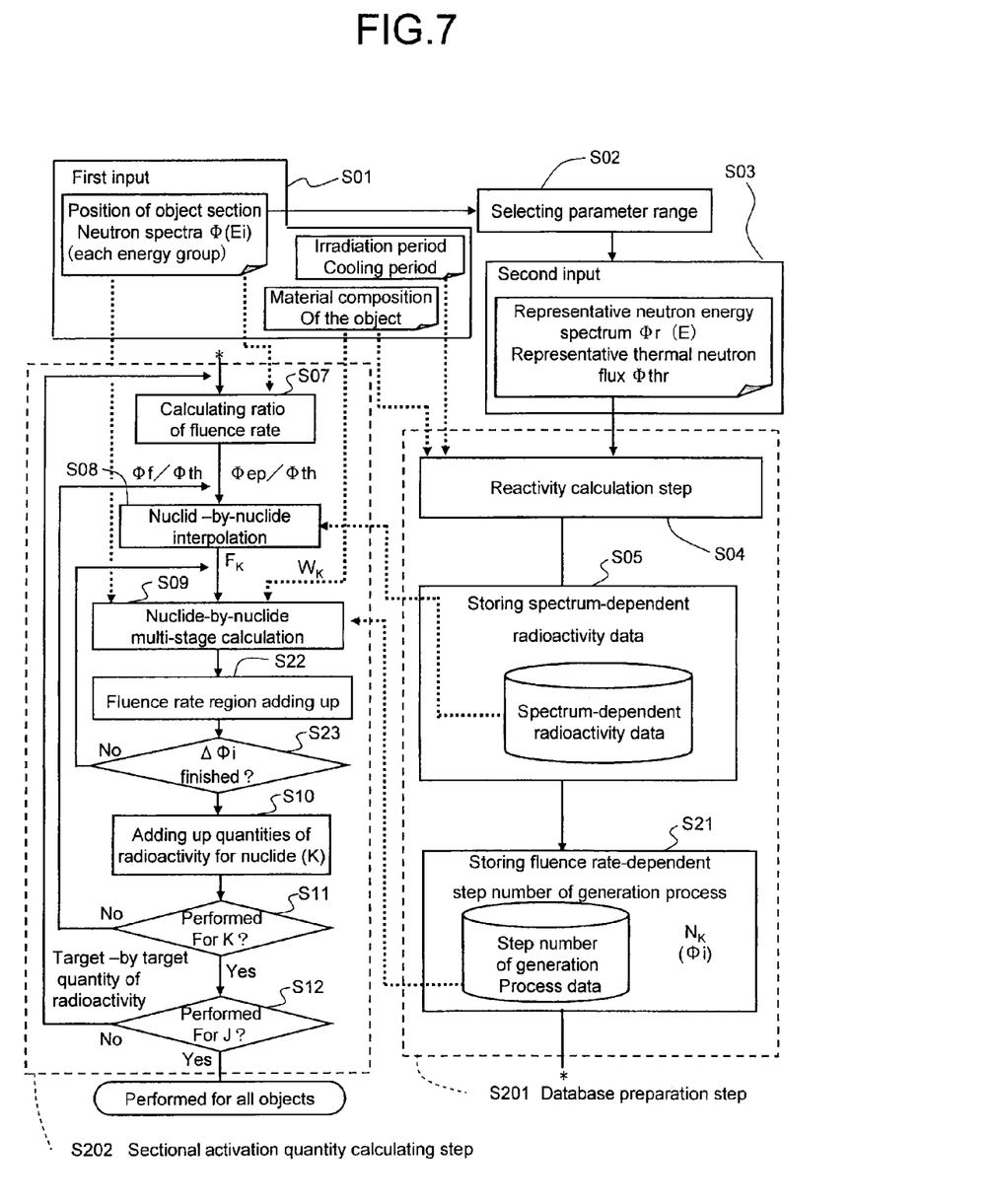
FIG. 7 is a flowchart of the second embodiment of radioactivity evaluation method according to the present invention.

FIG. 7 is a flowchart of the second embodiment of radioactivity evaluation method according to the present invention.

The processing sequence of this embodiment is basically same as that of the first embodiment of radioactivity evaluation method. A processing portion for accommodating the step number of generation process that varies depending on the neutron fluence rate as described above is added in this embodiment.

The data on the step number of generation process determined by calculations in the radioactivity calculation step S04 is stored in the step number of generation process storing step S06 in the radioactivity evaluation method of the first embodiment. On the other hand, the fluence rate dependency characteristic of the step number of generation process as determined by calculations in the radioactivity calculation step S04 is stored in the fluence rate-dependent step number of generation process storing step S21 of the database preparation step S201 in the radioactivity evaluation method of this embodiment. More specifically, the neutron fluence rate is divided into neutron fluence rate blocks $\Delta\phi$i within the range in which the neutron fluence rate varies. The radioactivation reaction rate for the neutron fluence rate of each block is stored into the database.

$N_K$ dependent on the neutron spectrum is prepared in the sectional quantity of radioactivation calculating step S202. The database is prepared in the database preparation step. $C_K(\phi i)$ is determined by means of the formula (2) with the neutron fluence rate and the step number of generation process. The step number of generation process corresponds to the neutron fluence rate $\phi$i, in each neutron fluence rate region in the nuclide-by-nuclide multi-stage calculating step S09.

The values of $C_K(\phi i)$ for the neutron fluence rate blocks $\Delta\phi$i calculated in the nuclide-by-nuclide multi-stage calculating step S09 are added up in the fluence rate region adding up step S22.

It is checked and determined if the adding-up calculations in the fluence rate region adding up step S22 have been performed for all the region of fluence rate or not in the fluence rate region determining step S23. If it is determined that the adding-up calculations in the fluence rate region adding up step S22 have not been completed for all the region of fluence rate, the embodiment moves to the next the calculations for the fluence rate $\phi$i of next block $\Delta\phi$i. On the other hand, the embodiment moves to the calculations for the next nuclide if it is determined that the adding-up calculations in the fluence rate region adding up step S22 have been performed for all the region of fluence rate.

This embodiment can secure a good accuracy by taking the step number of generation process which is dependent on neutron fluence rate into consideration in instances where the step number of generation process cannot be regarded as constant.

The present embodiment can provide an effective, accurate and efficient radioactivity evaluation method. It firstly prepares a database, using the results obtained by calculating the quantity of radioactivity for a plurality of instances. Then, it executes an interpolation process and a nuclide-by-nuclide multi-stage calculation process, using the data of the database, and totaling the obtained results.

Third Embodiment

Figure 8:
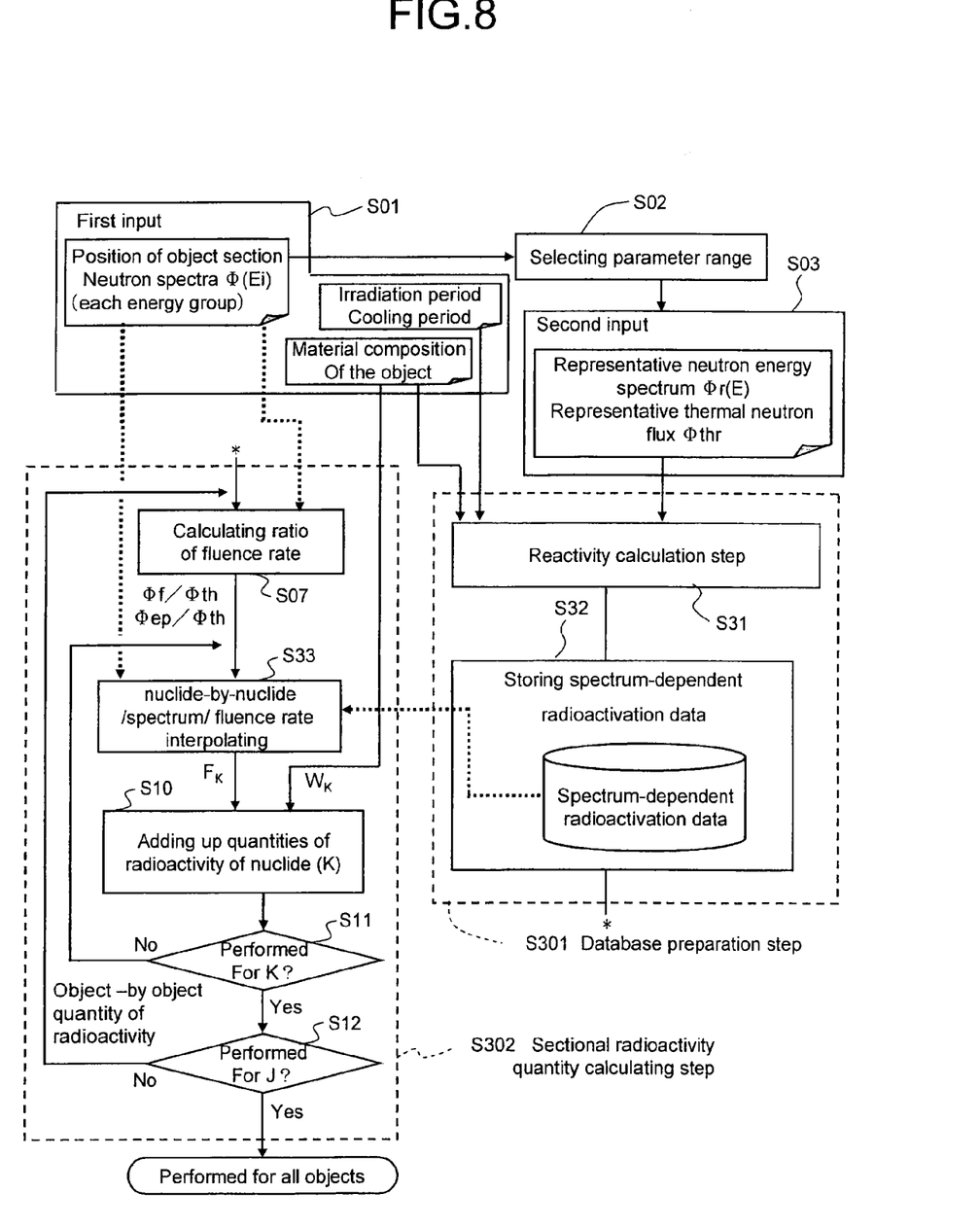
FIG. 8 is a flowchart of the third embodiment of radioactivity evaluation method according to the present invention.

FIG. 8 is a flowchart of the third embodiment of radioactivity evaluation method according to the present invention. This embodiment is similar with the second embodiment in the point that where the step number of generation process $N_K$ cannot be regarded as constant. This embodiment involves that $N_K$ varies depending on the neutron fluence rate.

This embodiment does not treat the dependency of the step number of generation process $N_K$ on the neutron fluence rate ϕ calculated in the radioactivity calculation step S04. This point is different from the first and second embodiments.

The embodiment performs radioactivity calculations with the conditions of the dependency on the neutron fluence rate ϕ in the radioactivity calculation step S31.

The quantities of radioactivity that corresponds to the representative neutron energy spectra and the neutron fluence rates are stored as database in the spectrum/fluence rate-dependent radioactivity data storing step S32 on the basis of the results calculated in the radioactivity calculation step S31.

A database of quantities of radioactivity is prepared with the dependency on the neutron fluence rate ϕ into consideration. The sectional radioactivity quantity calculating step S302 uses the database prepared in the database preparation step S301. Radioactivity is interpolated with the neutron spectrum, FAST=ϕf/ϕth and RES=ϕep/ϕth in the nuclide-by-nuclide/spectrum/fluence rate interpolating step S33.

Interpolation calculations are performed on the basis of the neutron fluence rates ϕi.

This embodiment can secure a good accuracy by taking radioactivity dependency on the neutron fluence rate into consideration in instances where the step number of generation process can not be regarded as constant.

The present embodiment can provide an effective, accurate and efficient radioactivity evaluation method. It firstly prepares a database, using the results obtained by calculating the quantity of radioactivity for a plurality of instances. Then, it executes an interpolation process and a nuclide-by-nuclide multi-stage calculation process, using the data of the database, and totaling the obtained results.

Fourth Embodiment

Figure 9:
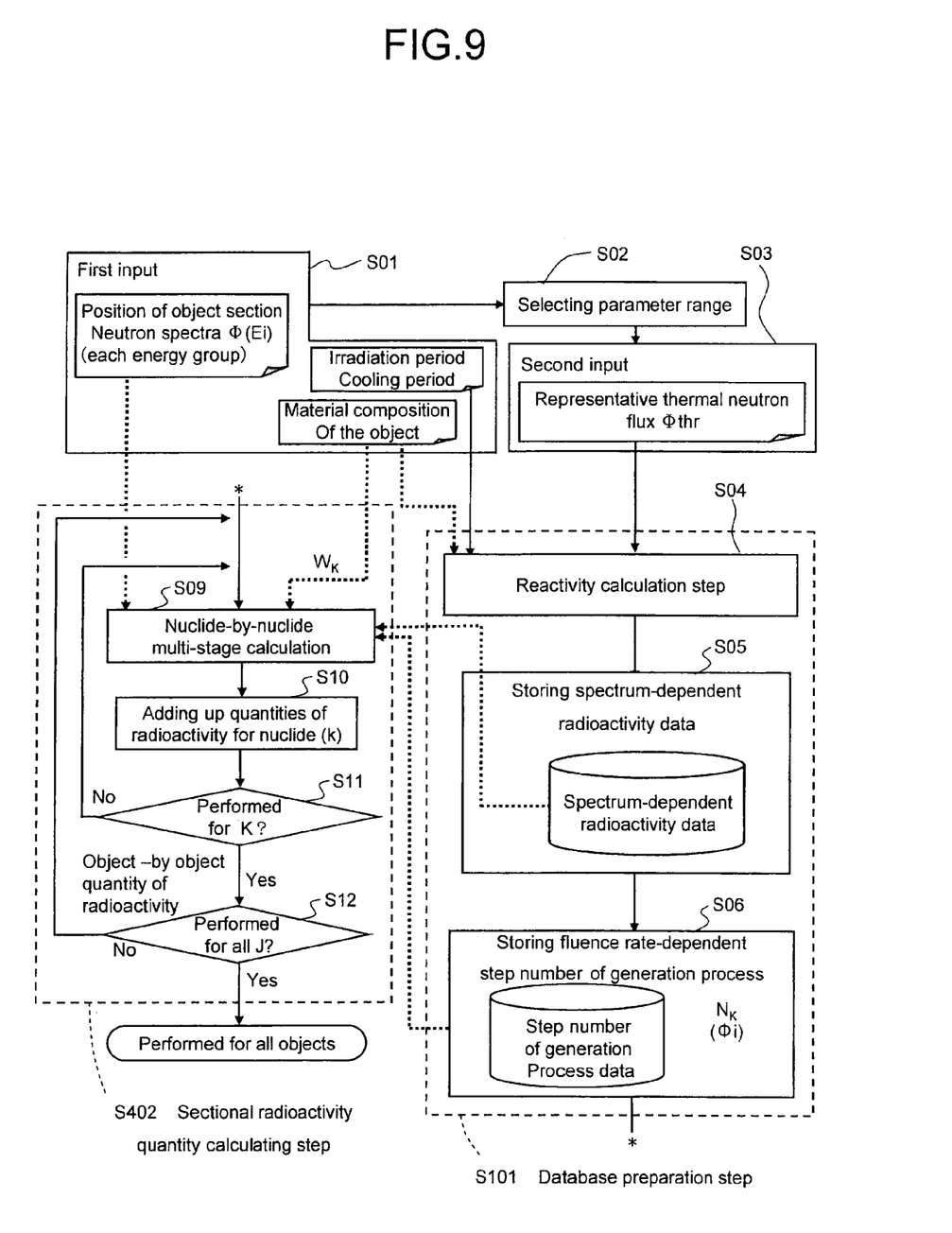
FIG. 9 is a flowchart of the fourth embodiment of radioactivity evaluation method according to the present invention.

FIG. 9 is a flowchart of the fourth embodiment of radioactivity evaluation method according to the present invention.

This embodiment provides a radioactivity evaluation method that is an instance where the neutron energy spectra of object sections for radioactivity evaluation can be regarded as the same profile.

The expression of a same profile refers to instances where the neutron fluence rate ratios of energy groups are equal to each other. For example, the ratio of ϕf to ϕth and the ratio of ϕep to ϕth are equal in an instance of three energy groups including a fast neutron group, a epithermal neutron group and a thermal neutron group. That means that the value of FAST=ϕf/ϕth and that of RES=ϕep/ϕth are equal in each neutron energy spectrum.

Radioactivity based on a single spectrum can be sufficient in this case as the neutron irradiation radioactivity calculation step S04 in such an instance. For example, the calculation based on the representative neutron fluence rate ϕtr can be sufficient.

This embodiment does not require the nuclide-by-nuclide interpolating step S08 in the first embodiment and nuclide-by-nuclide/spectrum/fluence rate interpolating step S33 in second embodiments. The fourth embodiment does not include a step corresponding to these steps in the sectional radioactivity quantity calculating step S402.

This embodiment has a correction process, using the ratio of the overall neutron fluence rate ϕt and the representative neutron fluence rate ϕtr in the nuclide-by-nuclide multi-stage calculating step S09. It is common with the first and second embodiments.

The present embodiment can provide an effective, accurate and efficient radioactivity evaluation method. It firstly prepares a database, using the results obtained by calculating the quantity of radioactivity for a plurality of instances. Then, it executes a nuclide-by-nuclide multi-stage calculation process, using the data of the database, and totaling the obtained results.

Other Embodiments

The present invention is described above by way of several embodiments. However, the embodiments are presented only as examples without any intention of limiting the scope of the present invention. For instance, a radioactivity evaluation method of the present invention is described so as to make it correspond to the functional features of a radioactivity evaluation system according to the present invention. However, a similar method can equally provide the advantages of the present invention without relying on any radioactivity evaluation system.

The present invention is by no means limited thereto while an instance of contracting the neutron energy spectra to those of three energy groups of fast neutrons, epithermal neutrons and thermal neutrons is described above, for each of the embodiments. The neutron energy spectra can be set as more energy groups.

Moreover, the functions features of any of the above-described embodiments can be combined for use. For example, the technique of considering the fluence rates of individual nuclides of the second embodiment can be combined with the fourth embodiment. For another example, the processing sequence of radioactivity calculations of the third embodiment can be combined with the fourth embodiment.

Furthermore, different modes of carrying out the present invention may be employed for the above-described embodiments. Any of the components of each of the above-described embodiments may be omitted, replaced or altered without departing from the scope of the present invention. Such embodiments and modifications made to them are also included in the spirit and scope of the present invention, particularly in the scope of the claims and their equivalents.

What is claimed is:

1. A radioactivity evaluation method of evaluating radioactivity on each object sections irradiated with neutrons in a neutron generating facility by means of a radioactivity evaluation system including a calculating section, a memory section, an input section and an output section, the method comprising:
   a first input step in which the input section reads in a neutron energy spectrum at each position of the object sections, an irradiation period and a cooling period and composition of each material of the object sections;
   a selection step in which the calculating section selects a representative neutron energy spectrum and a representative neutron fluence rate from the neutron energy spectra at each position of the object sections read in the first input step;
   a second input step in which the calculating section reads in the representative neutron energy spectra and the representative neutron fluence rates selected in the above selection step;
   a radioactivity calculating step in which the calculating section calculates quantities of the radioactivity that correspond to the representative neutron energy spectra and the representative neutron fluence rates based on the neutron energy spectra at each position of the object sections, the irradiation period and the cooling period, and the composition of the material of each object sections read in the first input step and the representative neutron energy spectra and the representative neutron fluence rate read in the second input step;

a data storing step in which the memory section stores the quantities of the radioactivity calculated in the radioactivity calculating step as radioactivity data;

a nuclide-by-nuclide radioactivation reaction rate calculating step in which the calculating section calculates a radioactivation reaction rate of each nuclide based on the neutron energy spectra at each position of the object sections read in the first input step and the radioactivity data stored in the data storing step;

an object-by-object adding-up step in which the calculating section adds up the radioactivation reaction rates of constituting nuclides calculated for each of the object sections in the nuclide-by-nuclide radioactivation reaction rate calculating step;

a nuclide determining step in which the calculating section determines if the radioactivation reaction rates of the constituting nuclides are added up in the object-by-object adding-up step or not; and an object position determining step in which the calculating section determines if the adding-up operation is performed for the positions of the object sections or not.

2. The radioactivity evaluation method according to claim 1, wherein the output section further displays the representative neutron energy spectra and the representative neutron fluence rates selected in the selection step; and the second input step further has a step of additionally input amendments to the representative neutron energy spectra and the representative neutron fluence rates displayed by the output section.

3. The radioactivity evaluation method according to claim 1, wherein the representative neutron fluence rates are representative thermal neutron fluence rates; and the method further comprises:

a ratio of fluence rate calculating step in which the calculating section calculates fluence rate ratios of fast neutron fluence rates, and epithermal neutron fluence rates to thermal neutron fluence rates based on the neutron energy spectra at the position of each of the object sections read in the first input step; while a nuclide-by-nuclide interpolating step in which the calculating section calculates the radioactivation reaction rates by interpolating spectrum-dependent radioactivity data stored in spectrum-dependent radioactivity data memory section on the basis of the fluence rate ratios calculated in the ratio of fluence rate calculating step.

4. The radioactivity evaluation method according to claim 3, wherein a step number of generation process calculated in the radioactivity calculating step is not dependent on neutron fluence rates; and the data on the step number of generation process that is not dependent on the neutron fluence rates obtained in the radioactivity calculating step is used in the nuclide-by-nuclide radioactivation reaction rate calculating step.

5. The radioactivity evaluation method according to claim 3, wherein the radioactivity that corresponds to the representative neutron energy spectra and a step number of generation process that depends on the neutron fluence rates are calculated in the radioactivity calculating step; and the data on the step number of generation process dependent on the neutron fluence rates obtained in the radioactivity calculating step is additionally used in the nuclide-by-nuclide radioactivation reaction rate calculating step.

6. The radioactivity evaluation method according to claim 3, wherein the radioactivity that corresponds to the representative neutron energy spectra obtained by considering the dependency of a step number of generation process on the neutron fluence rates is calculated in the radioactivity calculating step; and the radioactivity data corresponding to the representative neutron energy spectra obtained by considering the dependency of the step number of generation process on the neutron fluence rates as calculated in the radioactivity calculating step is stored in the data storing step; while the calculation of the radioactivation reaction rate of each nuclide in the nuclide-by-nuclide radioactivation reaction rate calculating step is performed for each block of the neutron fluence rate; and the method further comprises:

a block-by-block fluence rate adding-up step of adding up the radioactivation reaction rates calculated for each block of the neutron fluence rate in the nuclide-by-nuclide radioactivation reaction rate calculating step; and a fluence rate range determining step of determining if the adding-up operation in the block-by-block fluence rate adding-up step is performed for a range of neutron fluence rates or not.

7. The radioactivity evaluation method according to claims 1, wherein in a case where the neutron energy spectra of each object section can be regarded to be same;

the respective neutron fluence rates are representative thermal neutron fluence rates.

8. A radioactivity evaluation system for evaluating radioactivity of an object to be irradiated with neutrons in a neutron generating facility; the system comprising:

a first input section that reads in neutron energy spectra, an irradiation period and a cooling period at a position of each of object sections and composition of material of each of the object sections;

a selection section that selects a representative neutron energy spectrum and a representative neutron fluence rate from the neutron energy spectra at the position of each of the object sections read in the first input section;

a second input section that reads in the representative neutron energy spectra and the representative neutron fluence rates selected in the selection section;

an radioactivity calculating section that calculates quantities of the radioactivity that correspond to the representative neutron energy spectra and the representative neutron fluence rates based on the neutron energy spectra, the irradiation period and the cooling period at the position of each of the object sections and the composition of the material of each of the object sections read in the first input section and the representative neutron energy spectra and the representative neutron fluence rate read in the second input section;

a data memory section that stores the quantities of the radioactivity calculated in the radioactivity calculating section;

a nuclide-by-nuclide radioactivation reaction rate calculating section that calculates a radioactivation reaction rate of each nuclide on the basis of the neutron energy spectra at the position of each of the object sections read in the first input section and a radioactivity data stored in the data memory section;

an object-by-object adding-up section that adds up the radioactivation reaction rates of constituting nuclides calculated for each of the object sections in the nuclide-by-nuclide radioactivation reaction rate calculating section;

a nuclide determining section that determines if the adding up of the radioactivation reaction rates of the constituting nuclides are accomplished in the object-by-object adding-up section or not; and an object position determining section that determines if the adding-up operation is accomplished for the positions of the object sections or not.

* * * * *